United States Patent Office 3,259,394
Patented July 5, 1966

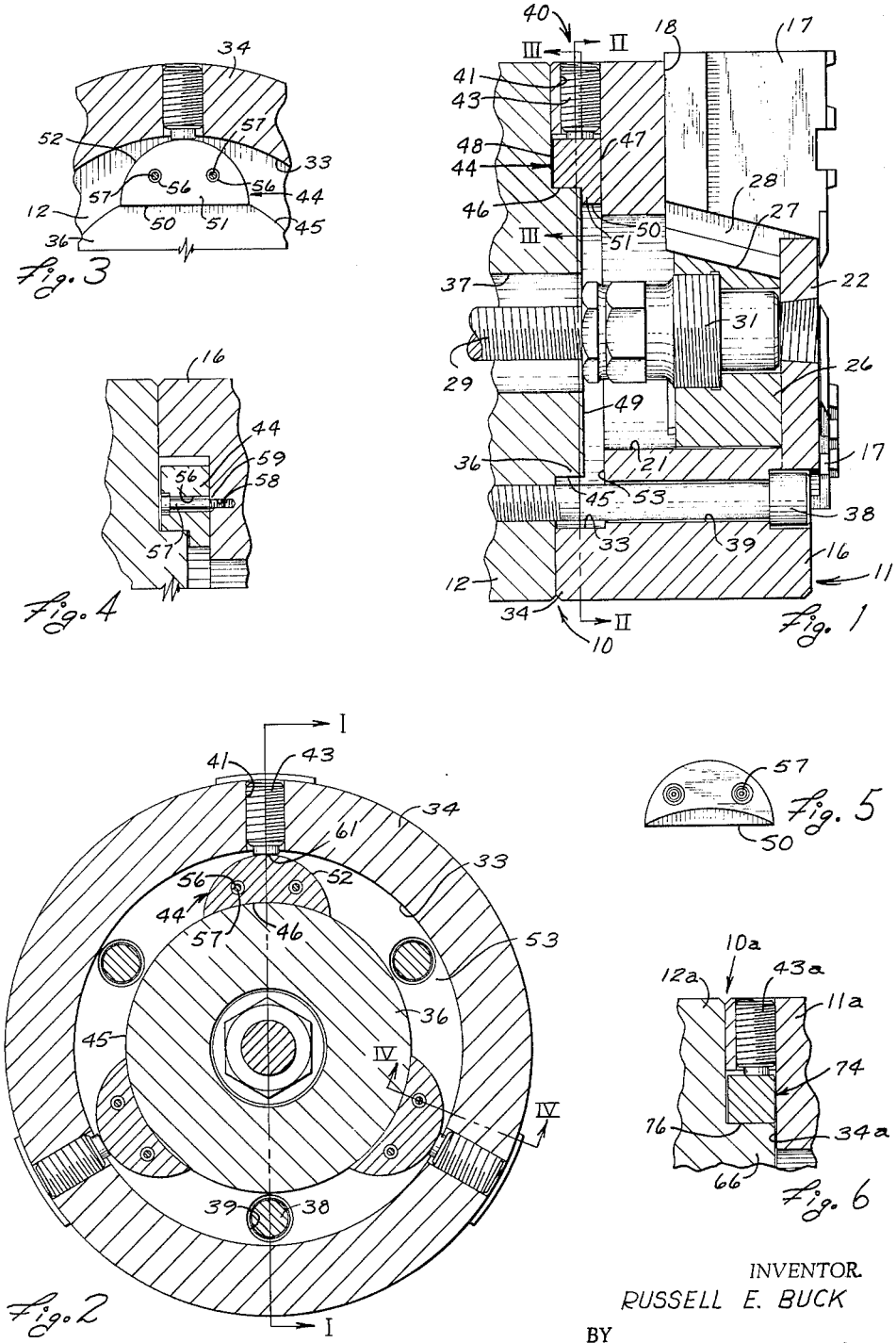

3,259,394
RADIALLY ADJUSTABLE CHUCK
Russell E. Buck, Scotts, Mich., assignor to Buck Tool Company, Kalamazoo, Mich., a corporation of Michigan
Filed Apr. 13, 1964, Ser. No. 359,189
9 Claims. (Cl. 279—6)

This invention relates to a radially adjustable chuck and, more particularly, relates to a chuck construction in which a plurality of adjustment devices mounted on the chuck act individually and directly against a pilot on means supporting said chuck.

In the past, it has often been the practice to mount a manually actuated universal chuck or a power chuck on the exposed radial face of a lathe face plate. Such a face plate often includes an axially extending pilot upon which the chuck is telescoped for positively radially locating said chuck with respect to said face plate. Suitable bolts or the like secure the chuck against axial movement away from said base plate. It has long been a recognized problem in such chuck constructions that a workpiece gripped in such a chuck may have its geometric axis eccentrically located with respect to its rotational axis due to the inability of the chuck jaws to locate the workpiece precisely coaxially of the chuck, due to an eccentric chuck location upon said face plate or due to other similar deviations which may occur.

An effective solution to this problem is shown by United States Patent No. 2,639,157 assigned to the assignee of the present invention. This patent proposes spaced circumferential location of radially directed adjusting screws in the peripheral portion of the chuck surrounding the pilot and for bearing on said pilot, there being sufficient radial clearance between the pilot and chuck that the chuck may be radially adjusted on the pilot by radial adjustment of said adjustment screws therein. In certain instances, however, it has been found that the rotation of the adjusting screws while in contact with the pilot scores the surface of said pilot thereby limiting its usefulness for supporting chucks of other types and, eventually, preventing effective and positive radial adjustment of a chuck on the pilot. Moreover, face plates are sometimes used which have relatively short pilots which are overhung axially of the chuck by said screws whereby the screws bear insecurely on the pilot. If the pilot is short enough, the screws will not bear at all thereon.

A later development has eliminated such scoring of the pilot by placing a ring snugly upon said pilot and allowing the adjusting screws to bear on the radially outer surface of the ring. Unfortunately, however, such a ring has not been usable in cases where the outside diameter of the chuck body exceeds the outside diameter of the pilot by only a small amount. Thus, the peripheral portion of the chuck surrounding the pilot must be of a minimum radial thickness in order to properly threadedly support the adjusting screws and regardless of an increase in the diameter of the pilot. The enlargement of pilot diameter therefore must be compensated for by a reduction in the radial width of the adjustment ring located between said peripheral portion and pilot. However, in a chuck construction of the type described, the bolts axially securing the chuck to the face plate are often radially located between the pilot and said peripheral portion. As a result, in cases where the pilot is small enough in diameter, said bolts pass through suitable axial holes in the adjustment ring. Thus, a large diameter pilot often requires the adjustment ring to be of sufficiently diminished radial width as to approach the diameter of the bolts to be passed therethrough whereby the wall thickness of the holes in the adjustment ring becomes insufficient.

Chuck construction incorporating an adjustment ring of the type described have also been disadvantageous in that effective operation thereof has required that the ring fit firmly and snugly on the pilot. Thus, even when the pilot and ring have cooperating tapered surfaces of contact, a particular ring has been limited to engaging essentially one size of pilot. Thus, a given chuck may only be used upon one size of pilot unless it is desired to change the adjustment ring.

It has been with the afore-mentioned problems in mind that the chuck construction described hereinbelow and embodying the invention was created.

Accordingly, the objects of the invention include:

(1) To provide a construction for radially adjusting a chuck on a lathe face plate and, more particularly, to provide a construction in which a plurality of adjustment devices act individually and directly against a pilot on said face plate.

(2) To provide a construction, as aforesaid, in which each of said adjustment devices requires only a minimum radial spacing between the pilot and the adjacent peripheral portion of the chuck, in which axial bolts used to retain the chuck axially with respect to the face plate do not pass through said adjustment devices and which is capable of receiving without modification pilots of differing diameters.

(3) To provide a construction, as aforesaid, in which said adjustment devices each includes an adjusting screw capable of adjustment radially of said chuck and a shoe member between said screw and said pilot, said shoe member having a relatively large area in contact with said pilot to prevent scuffing or other damage thereto and to provide a relatively low unit pressure loading therebetween.

(4) To provide a construction, as aforesaid, in which said shoe is held in operating position to maintain a constant area in contact with said pilot despite relative radial movement of the chuck and pilot during adjustment of said adjustment screws and whereby said shoe remains substantially fixed in place when the chuck is removed from the face plate.

(5) To provide a construction, as aforesaid, in which a chuck may be radially and adjustably mounted on a face plate having a relatively short pilot, such as a pilot which does not axially extend beyond or even to the centerline of said adjustment screws.

(6) To provide a construction, as aforesaid, which is readily and inexpensively manufactured, which is readily incorporated in designing new chucks as well as being readily adaptable to many existing chucks with little or no modification, which operates in a manner similar to existing adjustment devices, which is capable of a long service life with little or no maintenance and which is easily maintained, to the small extent, if any, which may be needed.

Other objects and purposes of this invention will be apparent to persons acquainted with apparatus of this general type upon reading the following specification and inspecting the accompanying drawings.

In the drawings:

FIGURE 1 is a fragmentary central cross-sectional view with a chuck construction embodying the invention.

FIGURE 2 is a sectional view taken on the line II—II of FIGURE 1.

FIGURE 3 is a fragmentary sectonal view taken on the line III—III of FIGURE 1.

FIGURE 4 is a section taken on the line IV—IV of FIGURE 2.

FIGURE 5 is a left elevational view of the contact shoe shown in FIGURE 4.

FIGURE 6 is a fragment of FIGURE 1 and showing a modification thereof.

Certain terminology will be used in the following description for convenience in reference only and will not be limiting. The words "upwardly," "downwardly," "rightwardly" and "leftwardly" will designate directions in the drawings to which reference is made. The words "frontwardly" and "rearwardly" will refer to directions to the right and left, respectively, in FIGURES 1 and 4. The words "inwardly" and "outwardly" will refer to directions toward and away from, respectively, the geometric center of the device and designated parts thereof. Said terminology will include the words above specifically mentioned, derivatives thereof and words of similar import.

General description

In general, the objects and purposes of this invention are met by providing a chuck construction wherein a chuck is mounted upon a face plate having an axially extended pilot. A plurality of adjusting screws are threaded in circumferentially spaced, radially disposed openings through an annular flange surrounding and radially spaced from said pilot and integral with said chuck. Each of said screws contacts a shoe positioned at the inner end of each of said screws and each shoe has a radially inner surface continuously contacting the pilot for the circumferential length of the shoe. Attachment means are provided for holding the shoe in position whereby said shoe is maintained in alignment with said screw during radial adjustment.

Detailed description

Turning now to the drawings, FIGURE 1 discloses a chuch construction 10 comprising a chuck 11 mounted by suitable means here comprising a lathe face plate 12 for rotation by a lathe (not shown). The chuck 11 may be of any desired type and is here shown as being a drawbar-actuated power chuck for purposes of illustration only. The chuck 11 and face plate 12 may be of substantially conventional construction with the exception of portions thereof embodying the invention and described in detail hereinafter. The substantially conventional portions of the chuck 10 need only be described briefly. Thus, the chuck 11 includes a cylindrical chuck body 16 having a plurality of circumferentially spaced jaw carriers 17 radially slidable in guideways 18 for carrying thereupon suitable jaws (not shown) by which a workpiece may be engaged. The chuck body 16 has a central cylindrical opening 21 therethrough which is closed at its forward end by a cover plate 22. A cylindrical wedging member 26 is axially slidably disposed in the opening 21 and carries a plurality of forwardly and inwardly sloped keyways 27 slidably gripping suitable sloped key means 28 on the radially inner end of the jaw carriers 17 whereby axial movement of the wedging member 26 causes radial movement of the jaw carriers 17 in a known manner. The wedging member 26 is connected to a suitable drawbar (not shown) by an externally threaded collar 31 threadedly engaging said wedging member 26 and a drawbar bolt 29 coaxially inserted into the collar 31 so that its threaded end is engageable by said drawbar. The chuck body 16 further includes a rearwardly opening coaxial recess 33 defined by an axially rearwardly extending annular flange 34 integral with the chuck body 16.

The face plate 12 includes a coaxial, perferably cylindrical pilot 36 extending axially forwardly therefrom. The pilot 36 is of sufficiently less diameter than the recess 33 in the chuck body 16 as to be receivable thereinto. The face plate 12 also has a central opening 37 for entrance of the drawbar bolt 29 thereinto.

A plurality, here three, of threaded bolts 38 are axially insertable through countersunk bolt holes 39 circumferentially spaced in the chuck body 16 and of sufficient diameter as to allow a small amount of radial movement therewithin of said bolts 38. The bolts 38 threadedly engage the face plate 12 and secure the chuck 11 thereto against axial movement away therefrom. In the particular embodiment shown, the pilot 36 and the flange 34 are sufficiently radially spaced as to allow passage of the bolts 38 therebetween.

The above-described construction is substantially conventional and is disclosed only to illustrate a possible, but not the only, operative environment for the hereinbelow-described construction embodying the invention.

Considering now the portion of the apparauts embodying the invention, FIGURES 1, 2 and 3 illustrate a preferred embodiment thereof.

The invention contemplates provision of a plurality of circumferentially spaced adjustment devices 40 for radially adjustably positioning the chuck 11 with respect to the face plate 12. Each adjustment device 40 includes a threaded opening 41 passing radially through the flange 34. A threaded adjustment screw 43 is threadedly engaged within each of the openings 41 for radial adjustment with respect thereto.

The adjustment screw 43 is adjustable for contacting at the radially inner end thereof a transfer member, such as a shoe 44, for contacting the pilot 36. The shoe 44 has a semicylindrical radially inner surface 46 for continuously contacting the circumferential surface 45 of the pilot 36. The shoe 44 has a forward wall 47 and a rearward wall 48 in parallel therewith and is received with a clearance between the radial surfaces of the recess 33 and the face plate 12. The shoe 44 extends radially outwardly from the surface 46 a distance somewhat less than the difference in radii of the pilot 36 and the recess 33 so that the chuck 11 may be adjusted radially of the pilot 36 for a nonzero distance before a shoe 44 contacts the circumferential wall of the recess 33 and prevents a continuation of the motion.

In the particular preferred embodiment shown, the pilot 36 is of lesser axial extent than is the recess 33 whereby the radial faces thereof are axially spaced. Although such an arrangement may occur for a variety of reasons, in the particular chuck construction 10 shown, the wedging member 26 is capable of travel rearwardly to a small degree into the recess 33. Thus, terminating the forward axial extent of the pilot 36 at a point spaced rearwardly from the radial wall 53 of the recess 33 prevents interference between the pilot 36 and said wedging member 26. As a result, the screw 43 overhangs the forward end of the pilot 36 which tends to exert a rocking couple on the shoe 43 in a radial plane of the chuck construction 10. This couple is effectively resisted by contact on the faces 47 and 48 of the shoe 44 with the adjacent radial surfaces of the chuck 11 and face plate 12. In the preferred embodiment shown, this couple is further resisted by the provision of a skirt 51 integral with the forward portion of shoe 44 and extending radially inwardly into the space between the radial faces 49 and 53, respectively, of the pilot 36 and recess 33.

It will be apparent that the screw 43 may overhang the pilot 36 by a greater or lesser amount than is shown in FIGURE 1. For example, the pilot 36 may be sufficiently short that the screw 43 overhangs same completely or, in other words, so that the screw 43 is located completely forwardly of the forward face of the pilot 36. In such a construction, a rocking couple exerted on the shoe by the adjusting screw and pilot will be more apparent. However, such a couple will still be resisted by the bearings, the shoe 44 on the chuck 11 and face plate 12.

In the preferred embodiment shown, the radially outer wall 52 of the shoe 44 is convex and semi-cylindrical and the radially inner edge surface 50 of the skirt 51 defines a chordal surface thereof. The particular shapes of the wall 52 and surface 50 of the shoe 51 were chosen to facilitate manufacture and other shapes for these surfaces are contemplated.

The attachment device 40 preferably includes means for maintaining the shoe 44 in operating position to prevent unintended displacement of said shoe 44 at times when the chuck 10 is not securely mounted upon the face plate 12. Such times occur during assembly or disassembly of the chuck construction 10, or when the chuck 11 is handled separately. Similarly, it is desirable that the shoe 44 be kept from circumferential displacement with respect to the screw 43 despite loss of contact with the pilot 36 when the chuck 10 is being adjusted radially of the face plate 12. Still further, the shoe 44 must be capable of pivotal movements with respect to the end of the screw 43 to allow firm and continuous contact of the surface 46 with pilot 36 when the chuck 11 is located eccentrically of said pilot 36.

A preferred embodiment of such mounting means is shown in FIGURES 1-5. Suitable openings 56 are provided through the shoe 44. Screws 57 extend through said openings 56, are threaded into a recess 58 in the chuck body 16 and are fixed solidly therein by any convenient means such as by screwing same against a shoulder 59. The portion of the screw 57 within the openings 56 is sufficiently smaller than said opening that the shoe 44 is permitted some movement with respect to said screws in the direction radial of said chuck body 16. The screw 43 has a flat end 61 which bears against the outer surface of the shoe 44. Thus, radial movement of the chuck body with respect to the shoes 44 will be permitted and adjustment of said screws 43 will effect radial adjustment of said chuck body with respect to the pilot 36 in the manner set forth in detail in U.S. Patent No. 2,639,157.

*Operation*

Although the operation of the device embodying the invention has been indicated somewhat above, said operation will be described hereinbelow to assure a more complete understanding of the invention.

Briefly, radial adjustment of the chuck 11 with respect to the face plate 12 may be accomplished after slightly loosening the bolts 38 to lessen the friction between the contacting radial surfaces of the face plate 12 and the flange 34. The adjustment devices 40 may then be actuated by threading the various ones of the screws 43 into or out of the openings 41 whereby radially inward forces exerted thereby through the shoes 44 and upon the pilot 36 will assure said radial adjustment.

After the chuck 11 is properly positioned radially upon the face plate 12 with the shoes 44 held tightly against the pilot 36 by the screws 43, the bolts 38 are tightened to increase the frictional holding force between the flange 34 and face plate 12 to resist radial movement between the chuck 11 and face plate 12.

*Modification*

FIGURE 6 discloses a modified chuck construction 10a wherein a pilot 66 extends radially forwardly to a location closely adjacent the radial face of the flange 34a but is otherwise similar to the afore-mentioned and shorter pilot 36. The shoe 74 is essentially similar to the aforementioned shoe 44 except that the skirt 51 is omitted and that the shoe 74 has a radially inner surface 76 that contacts the pilot 66 for essentially the entire axial extent of said shoe 74. Since the screw 43a does not overhang the forward end of said pilot 66, no rocking couple is exerted on said shoe 74. Hence, the shoe 74 does not require a skirt such as the skirt 51 of the preferred embodiment to resist such a couple.

Although a particular preferred embodiment of the invention has been disclosed above for purposes of illustration, it will be understood that variations or modifications thereof which lie within the scope of the appended claims are fully contemplated.

What is claimed is:
1. In a chuck construction, the combination comprising:
 a chuck having a recess in a radial face thereof;
 face plate means having a pilot on a radial face thereof, said radial faces of said chuck and face plate means being capable of contact whereby said pilot extends into said recess, the periphery of said pilot being substantially radially spaced from the peripheral wall of said recess;
 means for preventing avial movement of said chuck away from said face plate means but allowing radial adjustment of said chuck on said face plate means;
 adjustment means on said chuck adjustable substantially radially of said recess with respect to said chuck;
 a plurality of transfer members loosely radially disposed in the space between the periphery of said pilot and the peripheral wall of said recess capable of bearing radially on said pilot and contactable by said adjustment means whereby radial adjustment of said adjustment means urges said transfer members against the periphery of said pilot to adjust said chuck radially of said face plate means.

2. In a chuck construction for radially adjustably mounting a chuck on a face plate, the combination comprising:
 radial faces on said chuck and face plate in essentially continuous contact;
 means alternatively actuable for fixing said plate to said chuck and for allowing relative eccentric movement therebetween;
 a central recess in said radial face of said chuck defining a second radial surface displaced therefrom and a peripheral wall of said chuck radially surrounding said recess;
 a central circular pilot extending axially out of said radial face of said face plate into said recess, said pilot being of lesser radial extent than said recess;
 at least three adjustment screws threaded radially through said peripheral wall at circumferentially spaced locations thereon into said recess;
 circumferentially spaced transfer members disposed at least radially within said recess and interposed radially between the periphery of said pilot and corresponding ones of said adjustment screws, said transfer members each having a concave radially inner surface corresponding to the convex periphery of said pilot for continuously contacting same, said transfer member being of radial extent less than the difference in the radii of said pilot and said recess;
 whereby said adjusting screws, when adjusted radially of said chuck, act through said transfer members contacted thereby to move the chuck radially on said face plate.

3. The construction defined in claim 2 wherein said pilot is of lesser axial extent than is said recess;
 said transfer members each includes a skirt portion radially inwardly extending past the periphery of said pilot snugly but slideably between the radial surfaces of said pilot and said recess;
 whereby axial interference between said skirt portion and the ends of said pilot and recess assists in resisting rocking couples in a radial plane imposed on said transfer members by the overhang of said adjustment screws axially of said pilot.

4. The construction defined in claim 2 wherein said pilot is of essentially the same axial extent as said recess and wherein the radially inner face of said transfer member is smoothly and continuously curved and has a curvature corresponding to that of the circumferential surface of said pilot.

5. The construction defined in claim 2 wherein:
 each of said transfer members has at least one opening therethrough positioned substantially parallel to the axis of rotation of the chuck body;
 a screw extends through each of said openings and is rigidly affixed to said chuck body, said screws being of lesser dimension than said openings in a direction radial of the chuck body to permit radial movement of said transfer members with respect to said chuck body.

6. The construction defined in claim 2 wherein:

each of said transfer members has at least two openings therethrough positioned substantially parallel to the axis of rotation of the chuck body;

a screw extends through each of said openings and each is rigidly affixed to said chuck body, said screws being of lesser dimension than said openings in a direction radial of the chuck body;

whereby said transfer members will be held in approximately the proper position for operation when the chuck is disassociated from a supporting backplate and said shoes can still be adjusted as desired when the chuck is applied to a backplate.

7. In a chuck construction, the combination comprising:

a chuck body and a plate axially abutting same;

means for fixing said chuck body to said plate and actuable for allowing relative eccentric movement between said chuck body and plate;

a recess in said chuck body and a pilot on said plate radially loosely received in said recess for defining an annular space therebetween;

a circumferentially spaced plurality of adjustment shoes loosely radially received in said annular space and mounted on said chuck body for limited pivotal movement in a radial plane of the chuck;

a circumferentially spaced plurality of substantially radially adjustment screws threaded through said said chuck into said recess, each such screw being engageable with a corresponding shoe for urging same radially against said pilot independently of said other shoes;

whereby adjustment of said screws causes said shoes to adjust the radial location of said pilot in said recess.

8. The device defined in claim 7 in which said screws at least partially overhang said pilot.

9. The device defined in claim 7 in which the radially outer surface of the adjustment shoes are rounded about an axis parallel to the chuck axis, such rounded surfaces being of substantially lesser radius than said recess for permitting contact by the central portion of said screw with the shoe's outer surface when said shoe is cocked in a radial plane of the chuck due to eccentricity of said pilot.

References Cited by the Examiner
UNITED STATES PATENTS

| | | | |
|---|---|---|---|
| 1,723,356 | 8/1929 | Knowles | 279—6 |
| 2,639,157 | 5/1953 | Buck | 279—6 |
| 2,847,226 | 8/1958 | Sloan | 279—6 |
| 2,898,120 | 8/1959 | Goepfrich | 279—7 |

ROBERT C. RIORDON, *Primary Examiner.*

H. V. STAHLHUTH, *Assistant Examiner.*